United States Patent
Tajime et al.

(10) Patent No.: US 7,333,542 B1
(45) Date of Patent: Feb. 19, 2008

(54) MOVING PICTURE DECODING APPARATUS AND MOVING PICTURE DECODING METHOD

(75) Inventors: Junji Tajime, Tokyo (JP); Tetsuro Takizawa, Tokyo (JP)

(73) Assignee: NEC Corporation (JP)

( * ) Notice: Subject to any disclaimer, the term of this patent is extended or adjusted under 35 U.S.C. 154(b) by 672 days.

(21) Appl. No.: 09/334,354

(22) Filed: Jun. 16, 1999

(30) Foreign Application Priority Data

Jun. 19, 1998 (JP) ................... 10-173179

(51) Int. Cl.
*H04N 7/12* (2006.01)
*H04N 7/24* (2006.01)

(52) U.S. Cl. ................... 375/240.03; 375/240.12; 382/251

(58) Field of Classification Search ................... 375/240.01–240.09, 240.12–240.16, 240.24, 375/240.25; 382/232, 236, 238, 251; 708/203; *H04N 7/12, 7/24*

See application file for complete search history.

(56) References Cited

U.S. PATENT DOCUMENTS

| | | | | |
|---|---|---|---|---|
| 5,748,249 A | * | 5/1998 | Fujiwara ................ | 375/240.15 |
| 5,838,597 A | * | 11/1998 | Pau et al. ................ | 708/203 |
| 5,847,762 A | * | 12/1998 | Canfield et al. ........ | 375/240.05 |
| 6,005,623 A | * | 12/1999 | Takahashi et al. ..... | 375/240.16 |
| 6,081,295 A | * | 6/2000 | Adolph et al. ......... | 375/240.03 |
| 6,157,741 A | * | 12/2000 | Abe et al. .............. | 375/240.03 |
| 6,205,250 B1 | * | 3/2001 | Kranawetter ........... | 382/232 |
| 6,208,689 B1 | * | 3/2001 | Ohira et al. ............ | 375/240.12 |
| 6,243,421 B1 | * | 6/2001 | Nakajima et al. ...... | 375/240.25 |
| 2001/0008544 A1 | * | 7/2001 | Ishiyama ................ | 375/240.12 |

FOREIGN PATENT DOCUMENTS

| | | |
|---|---|---|
| EP | 0794672 A2 | 9/1997 |
| EP | 0814615 A2 | 12/1997 |
| EP | 0817498 A1 | 1/1998 |
| FR | 2745679 | 3/1997 |
| JP | 9-247673 | 9/1997 |
| JP | 9-261635 | 10/1997 |
| JP | 10-4550 | 1/1998 |

* cited by examiner

*Primary Examiner*—Thai Q. Tran
(74) *Attorney, Agent, or Firm*—Dickstein, Shapiro, LLP.

(57) ABSTRACT

A memory compression and expansion section (11 of FIG. 1) applies compression to a decoded image, and the result is stored in a frame memory. Based on an occupied content of the frame memory (FIG. 1, 106), in case that the number of coded bits for a single or a plurality of memory compression processing blocks or for every control unit of memory compression processing exceeds the number of bits of a memory access unit or is lacking, a memory access width control section (110 of FIG. 1) applies control to a quantizer control section (109 of FIG. 1) so that the number of coded bits is conformed to be equal to or less than the number of bits of memory access unit.

18 Claims, 4 Drawing Sheets

MOVING PICTURE DECODING APPARATUS AND MOVING PICTURE DECODING METHOD

BACKGROUND OF THE INVENTION

The present invention relates to a moving picture decoding apparatus, and especially, to a moving picture decoding apparatus capable of reducing a necessary capacity of a frame memory to be used when coded moving pictures are decoded.

Conventionally, this kind of a moving picture decoding apparatus is used in a method for reducing a necessary frame memory capacity used in the decoding process. As the conventional moving picture decoding apparatus, JP-A-261635/1997, for example, discloses an arrangement for reducing a frame memory capacity necessary for storage or reference images and re-ordering decoded images, which comprises a data compression circuit for compressing a decoded image and a data expansion circuit for expanding compressed data. Also, in JP-A-247673/1997, an arrangement is proposed in which a set of moving pictures data of which data content has been reduced by data content reducing means for reducing data content of data read from the frame memory is restored by data content restoring means.

Also, in JP-A-4550/1998, for example, an apparatus is proposed in which a reduction in memory use capacity is facilitated using Adaptive Differential Pulse Code Modulation (ADPCM). In the apparatus described in the publication, compression is conducted by estimating a change in each block of n×m pixels compressed using orthogonal translation, encoding a first pixel of each block with p bits in accordance with the ADPCM method, encoding an estimated value of the change with n×h bits, and further, encoding a difference value between each pixel following the first pixel and an average value of all pixels in the block with p–k bits.

However, in the conventional moving picture decoding apparatus proposed in the above-described JP-A-4550/1998 and so forth, in which the objective is to reduce the capacity of frame memory used, there is a problem in that efficient access to the memory cannot be realized.

The reason for this is that an access width of the memory is not taken into account in a memory compression and expansion section of the above-described moving picture decoding apparatus.

SUMMARY OF THE INVENTION

An objective of the present invention is to solve the above-mentioned problem.

Also, another objective of the present invention is to provide a moving picture decoding apparatus for reducing the capacity of a frame memory necessary to be used when an image is decoded by a compression operation and accomplishing the compression and expansion processing of a memory content with high speed, and further, for decoding an image with high quality.

To achieve the above-described objective, the moving picture decoding apparatus of the present invention, to which a compressed stream generated using an inter-frame prediction system is input, comprises compression means for compressing a decoded image when the signal is stored in a memory, expansion means for expanding a compressed image stored in the above-mentioned memory, quantization means for controlling quantization on compression in the above-described compression means, and access width control means for controlling the above-described quantization control means so that information content for a single or a plurality of memory compression processing units or for every control unit is a memory compression process is in conformity with the number of bits of an access unit of the above-mentioned memory.

In the moving picture decoding apparatus of the present invention, said access width control means comprises means for controlling said quantization control means so that the coded number of bits for a single or a plurality of compression processing units or for every control unit of compression processing is in conformity with the number of bits of an access unit of said storage means in the case that the coded number of bits exceeds the number of bits of an access unit of said storage means or is lacking.

Furthermore, in the moving picture decoding apparatus of the present invention, said compression means and expansion means may conduct compression and expansion, respectively, in accordance with a pixel difference prediction encoding system.

Furthermore, the moving picture decoding apparatus of the present invention may further comprise a plurality of quantizers and a plurality of quantization characteristic tables.

Furthermore, the moving picture decoding apparatus of the present invention may further comprise a plurality of quantizers and a quantization characteristic table being shared by said plurality of quantizers.

Furthermore, in the moving picture decoding apparatus of the present invention, said compression means and expansion means may conduct compression and expansion, respectively, in accordance with an orthogonal translation encoding system.

Furthermore, in the moving picture decoding apparatus of the present invention, said access width control means preferably conducts control using information included in the compressed stream.

Furthermore, in the moving picture decoding apparatus of the present invention, said storage means is preferably a frame memory.

BRIEF DESCRIPTION OF THE DRAWINGS

These and other objects, feature and advantages of the present invention will become more apparent upon a reading of the following detailed description and drawings, in which.

DESCRIPTION OF THE PREFERRED EMBODIMENTS

An example of the present invention will be explained. In a moving picture decoding apparatus of the present invention, compression is applied to a decoded image in a memory compressor (105 of FIG. 1), and the compressed decoded image is stored in a frame memory (106 of FIG. 1). Based on the occupied content in the frame memory (106 of FIG. 1), in the case that the number of coded data bits for a single or a plurality of memory compression processing units or for every control unit of memory compression process exceeds the number of bits of a memory access unit or is lacking, a memory access width control section (110 of FIG. 1) applies control to a quantizer control section (109 of FIG. 1) so that the number of coded data bits is conformed to be equal to or less than the number of bits of the memory access unit.

First, the principle of the present invention will be explained. A decoded image is compressed using one of various compression methods. However, the number of coded data bits per compression processing unit is allocated during the compression operation based on compression ratio, and the number of bits of a memory access unit is not taken into account.

It is assumed that the number of bits of the memory access unit is M1 bits, and the number of coded data bits of the compressing processing units, which are allocated based on a compression ratio, are N1, N2, N3, ... Nn, respectively, and M1<N1+N2+ ... Nn. In this case, coded data of n blocks cannot be extracted through one access. Accordingly, by decreasing the number of bits allocated by N1+N2+ ... Nn by N1+N2+ ... Nn−M1, an allocated number of bits can be made equal to or less than M1, an allocated bit can be made equal to or less than M1, and therefore, the coded data can be taken out through one access.

Figure 2:
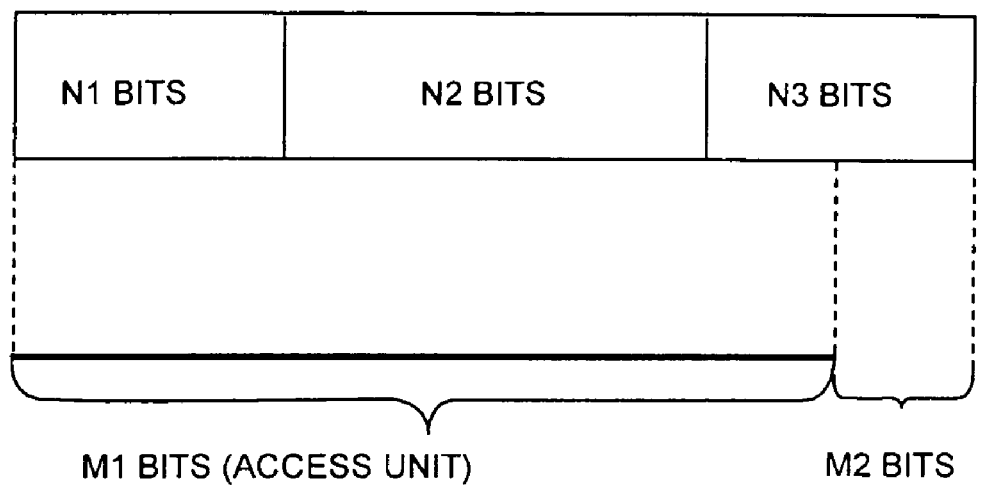
FIG. 2 is a diagram for explaining the principle of the present invention and for showing an access bit width and a width of an quantized data.

An example of n=3 as the n blocks is shown in FIG. 2. By subtracting more than or equal to M2(M2=N1+N2+N3)−M1) bits from N1+N2+N3 bits, an allocated number of bits can be made equal to or less than M1.

Figure 3:
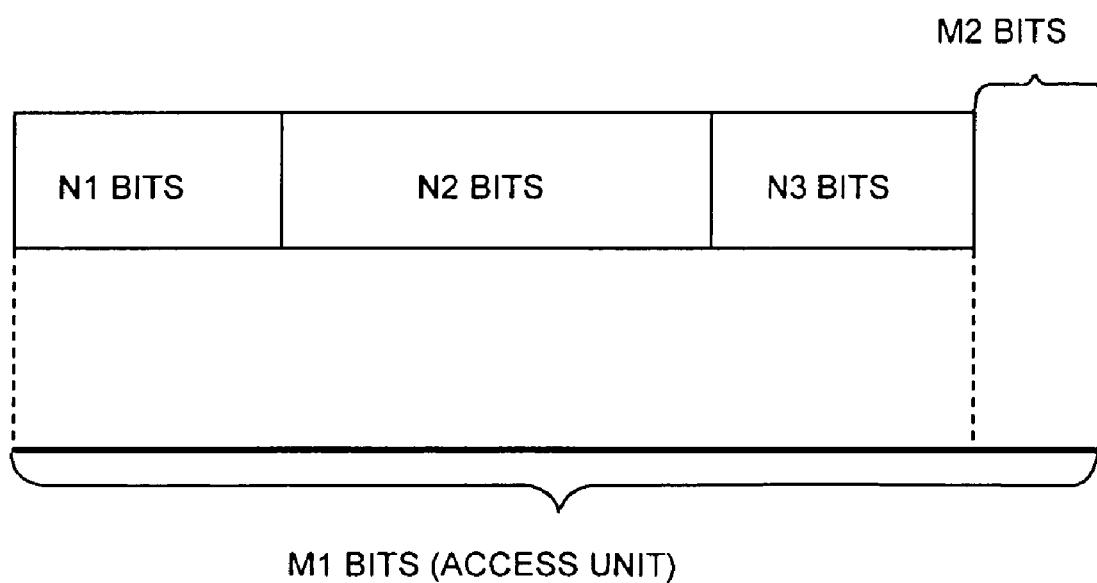
FIG. 3 is a diagram for explaining the principle of the present invention and for showing an access bit width and a width of a quantized data.

On the other hand, as shown in FIG. 3, in the case that the allocated number of bits is less than the number of bits M1 of a memory access unit, and a frame memory has enough capacity, allocation of the number of bits of the coded data can be also increased.

In the present invention, on the basis of such principal, the memory access width control section (110 of FIG. 1) applies control of an access width of the frame memory to the quantization control section.

In the present invention, the memory compressor and memory expander may have an arrangement in which compression and expansion are conducted, respectively, in accordance with DPCM.

In the present invention, based on access width information from the access width control section, in the case that the generated information content for a single or a plurality of memory compression processing units or for every control unit of a memory compression processing exceeds the number of bits of a memory access unit, quantization control is conducted by preparing a plurality of quantizers having different quantization characteristics, and a quantization table, and by selecting a quantizer that is adapted to the access width. In this case, an arrangement may be adopted in which one quantization table is shared by the plurality of quantizers having different quantization characteristics. In other words, by variably changing a reference interval of one quantization table in accordance with an obtained quantization characteristic (resolution and so forth), it is possible to obtain the different quantization characteristics while one quantization table is shared.

Also, in the present invention, the memory compressor and the memory expander may conduct compression and expansion, respectively, in accordance with an orthogonal translation encoding system.

Moreover, in the present invention, the access width control section may apply access width control to the quantization control section using information included in the compressed stream. Below, a detailed explanation will be made in accordance with a preferred embodiment of the invention.

Figure 1:
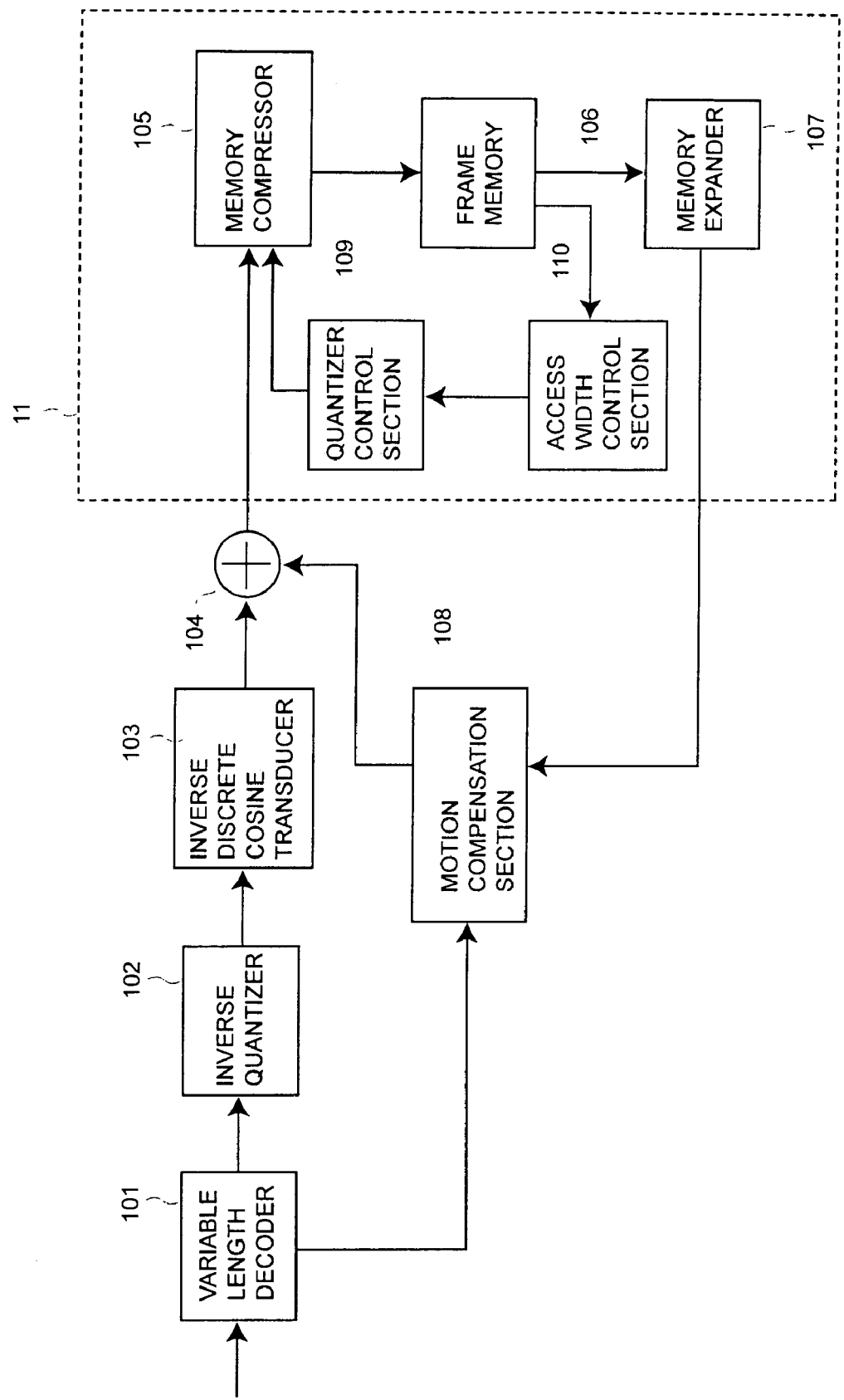
FIG. 1 is block diagram showing an arrangement of a moving picture decoding apparatus of the first preferred embodiment of the present invention.

A first preferred embodiment of the present invention will be explained in detail by referring to the drawings. FIG. 1 illustrates an arrangement of one embodiment of the present invention.

Referring to FIG. 1, this embodiment is constructed to include a variable length decoder 101, an inverse quantizer 102, an inverse discrete cosine transducer (inverse DCT) 103, an adder 104, a motion compensation section 108, and a memory compression and expansion section 11. The memory compression and expansion section 11 is constructed to include a memory compressor 105, a frame memory 106, a memory expander 107, a quantizer control section 109, and a memory width control section 110.

A compressed moving pictures stream encoded by a system such as ISOIS13818-2 (MPEG-2VIDEO) system is supplied as an input to the variable length decoder 101.

The variable length decoder 101 performs variable length decoding, and supplies a result thereof to the inverse quantizer 102.

The inverse quantizer 102 performs inverse quantization, and supplies a result thereof to the inverse discrete cosine transducer 103.

The inverse discrete cosine transducer 103 transduces a conversion coefficient into an image, and supplies a result thereof to the adder 104.

The adder 104 performs addition of the image supplied from the inverse discrete cosine transducer 103 and a predicted image supplied from the motion compensation section 108, and supplies a result thereof to the memory compression and expansion section 11.

The memory compression and expansion section 11 performs compression and expansion operations to a decoded image, and supplies it to the motion compensation section 108.

The motion compensation section 108 performs motion compensation based on a motion vector supplied from the variable length decoder 101 and the image supplied from the memory compression and expansion section 11, and supplies the predicted image to the adder 104.

The memory compressor 105 of the memory compression and expansion section 11 applies compression to the image supplied from the adder 104, and stores the compressed result in the frame memory 106.

The memory expander 107 extracts the compressed image from the frame memory 106 and expands it, and supplies the expanded result to the motion compensation section 108.

The quantization control section 109 applies control of quantization of the image to the memory compressor 105 and the memory expander 107.

The access width control section 110 applies control to the quantization control section 109 using information of the frame memory 106 so that the information content for a single or a plurality of memory compression processing units or for every control unit of the memory compression process is conformed to be equal to or less than the number of bits of a memory access unit.

As the compression encoding method in the memory compressor and the memory expander, any of pixel difference encoding, adaptive pixel difference encoding, DCT translation, Hadamard translation, and Wavelet translation and so forth, for example, may be used.

Figure 4:
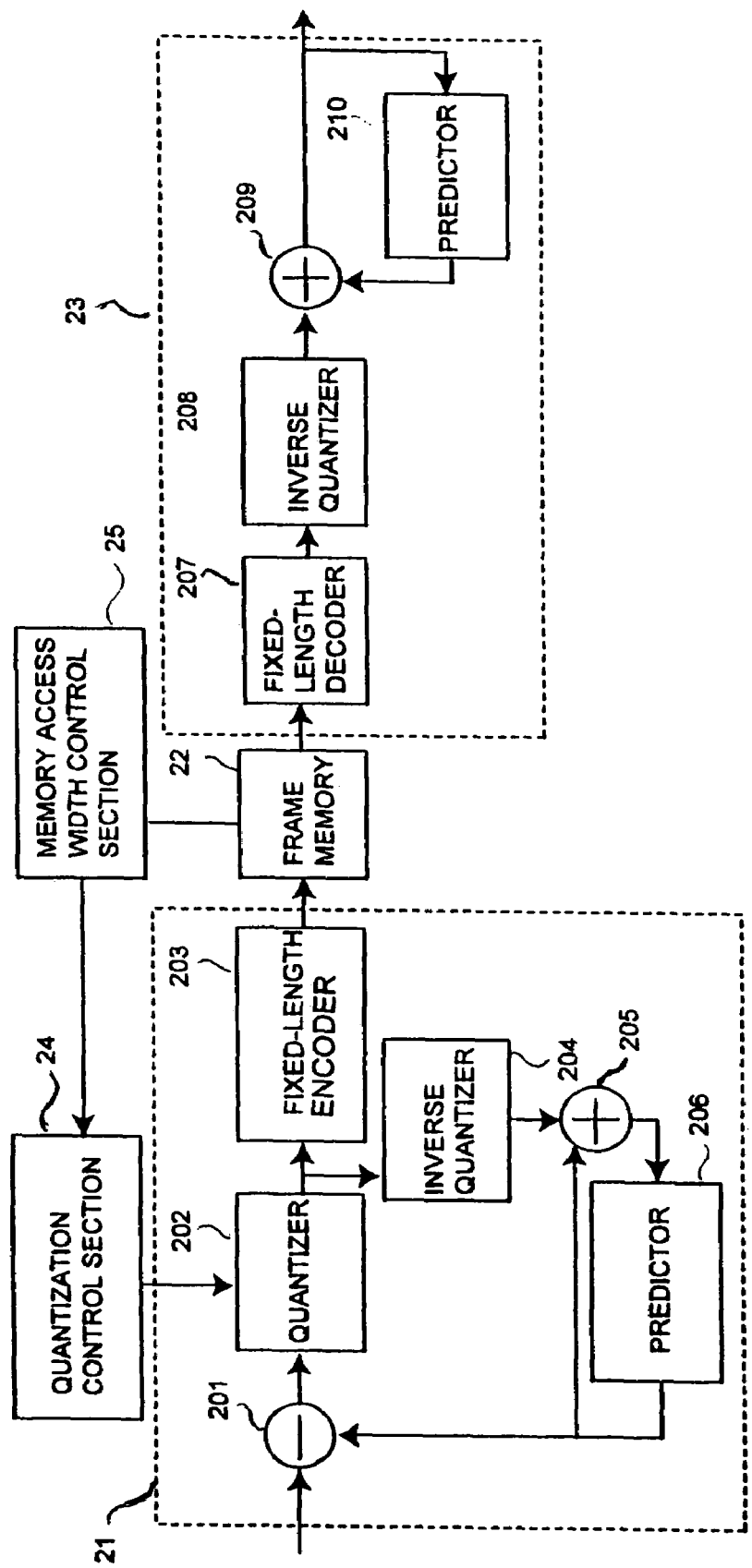
FIG. 4 is a block diagram for showing an arrangement of a memory compression and expansion section in the first embodiment of the present invention and FIG. 5 is a block diagram showing an arrangement of the second preferred embodiment of the present invention.

FIG. 4 illustrates an example of an arrangement of the memory compression and expansion section 11 according to the embodiment of the present invention discussed herein, in the case that the memory compressor 105 and the memory expander 107 operate according to the pixel difference encoding method. The memory compressor 105 and the memory expander 107 in FIG. 1 correspond to a memory compressor 21 and a memory expander 23 as shown in FIG. 4.

Referring now to FIG. 4, the memory compressor 21 is constructed to include a subtracter 201, a quantizer 202, a fixed-length encoder 203, an inverse quantizer 204, and adder 205, and a predictor 206. The memory expander 23 is constructed to include a fixed-length decoder 207, an inverse quantizer 208, an adder 209, and a predictor 210.

An image to be compressed is supplied to the subtracter 201 as an input, and the subtracter 201 performs subtraction of this input signal and a predicted value supplied from the predictor 206, and supplies a prediction error to the quantizer 202.

The quantizer 202 performs quantization of the prediction error in accordance with the quantization control section 24, and supplies the result to the fixed-length encoder 203 and the inverse quantizer 204.

The fixed-length encoder 203 encodes the quantized value and stores it in the frame memory 22. In the inverse quantizer 204, the adder 205 and the predictor 206, inverse quantization and local decoding are performed, and an output from the predictor 206 is supplied to the subtracter 201.

The memory access width control section 25 takes account of a compression ratio based on an occupied ratio of the frame memory 22, and applies bit allocation control to the quantization control section 24, which is in conformity with the number of bits of a memory access unit.

The quantization control section 24 performs quantization control in which memory access width information is added, and applies control to the quantizer 202 so that information content generated for a single or a plurality of memory compression processing units or for every control unit of the memory compression process is equal to or less than the number of bit of a memory access unit.

In this embodiment, if the compression processing unit is assumed to be constant, a block of a single pixel or a plurality of m×n pixels defines the compression processing unit.

The memory expander 23 receives a compressed image from the frame memory 22, and performs expansion of the compressed image by applying expansion and inverse quantization thereto, and outputs the resulting image.

Next, an example will be explained in which memory access width control is realized. One quantizer having a fixed compression ratio is used for quantization of a prediction error. As such, in the case that information content generated for a single or a plurality of memory compression processing units for every control unit of a memory compression process exceeds the number of bits of a memory access unit, a plurality of quantizers are prepared, and control is conducted so that the information content is in conformity with an access width. In this example, since an occupied content of the frame memory can be fixed, information from the frame memory is not required. In addition, an arrangement can be adopted in which a plurality of quantizers having quantization characteristics different from each other share one quantization characteristic table.

On the other hand, in a case of orthogonal translation and so forth, it is different to fix the information content generated for a single or a plurality of memory compression processing units or for every control unit in a memory compression process. In such a case, use of an occupied content of the frame memory is convenient.

Next, a second preferred embodiment of the present invention will be explained. In the above-described first embodiment, the access width control section 110 conducts control of the quantizer control section 109 using the access memory width and the occupied content of the frame memory.

Figure 5:
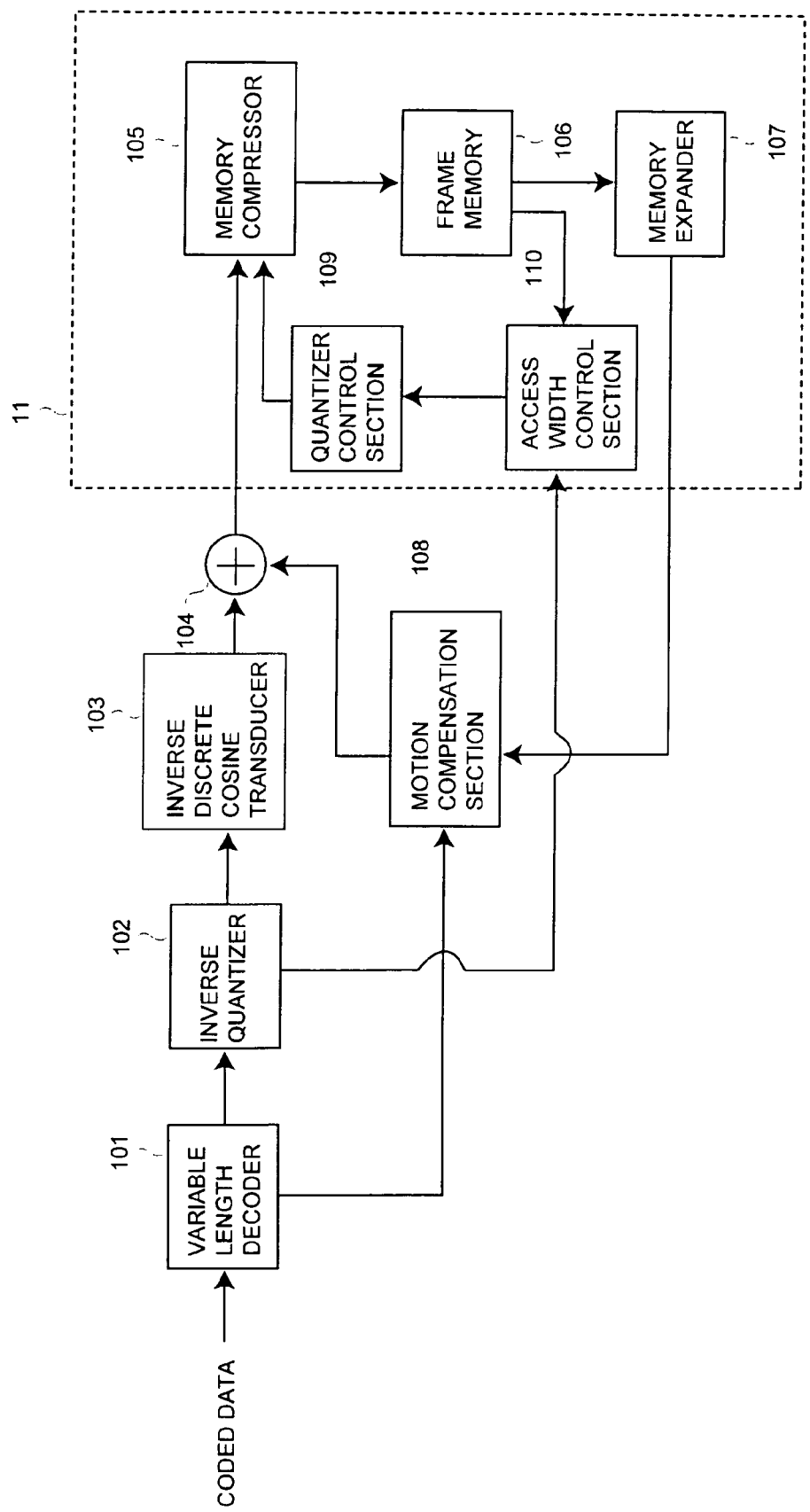

FIG. 5 illustrates an arrangement of the second embodiment of the present invention. Referring to FIG. 5, in this embodiment, the access width control section 110 receives information from the inverse quantizer 102, and applies control to the quantization control section 109, in which information included in a compressed stream is added, in other words, in which information during quantization is added. Accordingly, by taking account of the information of the compressed stream and a relationship between positions on an image, and so forth, allocation of the information content can be realized, which improves image quality.

Using the present invention as explained above, several advantages are effected as described below.

A first advantage of the present invention is that compression and expansion processing on the contents of the memory can be conducted with high speed.

The reason for this effect is that, in the present invention, since quantization control is conducted on a number of bits which is equal to or less than the number of bits of a memory access unit, a number of access occurrences to the memory to extract the compressed image for expansion thereof is reduced.

A second advantage of the present invention is that, by conducting allocation control of information content using the information included in the compressed stream, pixel error can be suppressed and image quality can be improved.

The reason for this effect is that, in the present invention, by taking account of the information of the compressed stream and a relationship between positions on an image, and so forth, allocation of the information content can be realized, which improves image quality.

What is claimed is:

1. A moving picture decoding apparatus to which a compressed stream generated using inter-frame prediction is input, said apparatus comprising:
   a compressor that compresses a decoded image and stores the resulting compressed image in a memory;
   an expander that expands a compressed image stored in said memory;
   a quantization controller that controls how quantization is performed in said compressor; and
   a memory access width controller that controls said quantization controller such that bit allocation is controlled in relation to a number of bits of a memory access unit of said memory.

2. The moving picture decoding apparatus according to claim 1, wherein said memory access width controller controls said quantization controller such that a number of coded bits of the image processed in said compressor for every control unit of compression processing is in conformity with the number of bits of the memory access unit of said memory in the case that the coded number of bits exceeds the number of bits of the memory access unit of said memory.

3. The moving picture decoding apparatus according to claim 1, wherein the compressor and the expander conduct compression and expansion, respectively, in accordance with a pixel difference prediction encoding system.

4. The moving picture decoding apparatus according to claim 1, wherein said quantization controller controls quantization by preparing a plurality of quantizers and a plurality of quantization characteristic tables.

5. The moving picture decoding apparatus according to claim 1, wherein said quantization controller controls quantization by preparing a plurality of quantizers and a quantization characteristic table being shared by said plurality of quantizers.

6. The moving picture decoding apparatus according to claim 1, wherein the compressor and the expander conduct compression and expansion, respectively, in accordance with an orthogonal translation encoding system.

7. The moving picture decoding apparatus according to claim 1, wherein said memory access width controller conducts control using information included in the compressed stream.

8. The moving picture decoding apparatus according to claim 1, wherein the memory is a frame memory.

9. A moving picture decoding apparatus to which a compressed stream generated using inter-frame prediction is input, said apparatus comprising:
a compressor that compresses a decoded image;
a memory that stores the compressed image output from said compression means compressor;
an expander that expands the compressed image stored in said memory;
a quantization controller that controls how quantization is performed in said compressor; and
a memory access width controller that applies bit allocation control to said quantization controller based on the number of bits of a memory access unit of said memory,
wherein said quantization controller controls quantization performed by the compressor based on access width information from said memory access width controller such that a number of bits of the image processed in said compressor for every control unit of compression processing is equal to or less than the number of bits of the memory access unit of said memory in the case that the number of bits for every control unit of compression processing exceeds the number of bits of memory access unit of said memory.

10. The moving picture decoding apparatus according to claim 9, wherein said memory access width controller applies bit allocation control to said quantization controller in conformity with the number of bits of the memory access unit of said memory, based on an occupied content of said memory.

11. The moving picture decoding apparatus according to claim 9, wherein the memory access width controller conducts control using information included in the compressed stream.

12. The moving picture decoding apparatus according to claim 9, wherein the memory access width controller applies control to the quantization controller such that when an allocated number of bits of coded data of a compression processing block exceeds the number of bits of the memory access unit of said memory or is less than the number of bits of the memory access unit of said memory, the allocated number of bits is made equal to or less than the number of bits of the memory access unit of said memory by subtracting a predetermined number of bits from the allocated bits of coded data of said compression processing block or by increasing the number of allocated bits by the predetermined number of bits, whereby the coded data is enabled to be extracted from said storage means memory with one access occurrence.

13. The moving picture decoding apparatus according to claim 9, wherein the compressor controls quantization characteristics used for quantizing said decoded image, based on control by said quantization controller.

14. The moving picture decoding apparatus according to claim 9, wherein said quantization controller controls quantization by preparing a plurality of quantizers having quantization characteristics different from each other, and wherein a quantization characteristic table is shared by said plurality of quantizers.

15. The moving picture decoding apparatus according to claim 9, wherein said compressor comprises a subtracter, a quantizer, an encoder, an inverse quantizer, an adder and a predictor, a prediction error obtained in said subtracter by a subtraction operation between said decoded image and a predicted value from said predictor is supplied to said quantizer, under control of said quantization controller, said quantizer quantizes said prediction error and supplies the quantized result to said encoder and said inverse quantizer, said encoder encodes an output from said quantizer and outputs the encoded result to said storage means memory, and inverse quantization and local decoding are conducted in said inverse quantization, said adder, and said predictor.

16. The moving picture decoding apparatus according to claim 9, wherein the memory is a frame memory.

17. A moving picture decoding method comprising the steps of:
detecting a number of coded bits for every control unit of compression processing and controlling said number of coded bits so that said number of coded bits is in conformity with the number of bits of a memory access unit of memory when said detected number of coded bits exceeds the number of bits of a memory access unit of said memory.

18. The moving picture decoding method according to claim 17, wherein said step of controlling comprises using information from an external compressed data stream.

* * * * *